M. E. CROFT.
TRICYCLES.
No. 194,416. Patented Aug. 21, 1877.
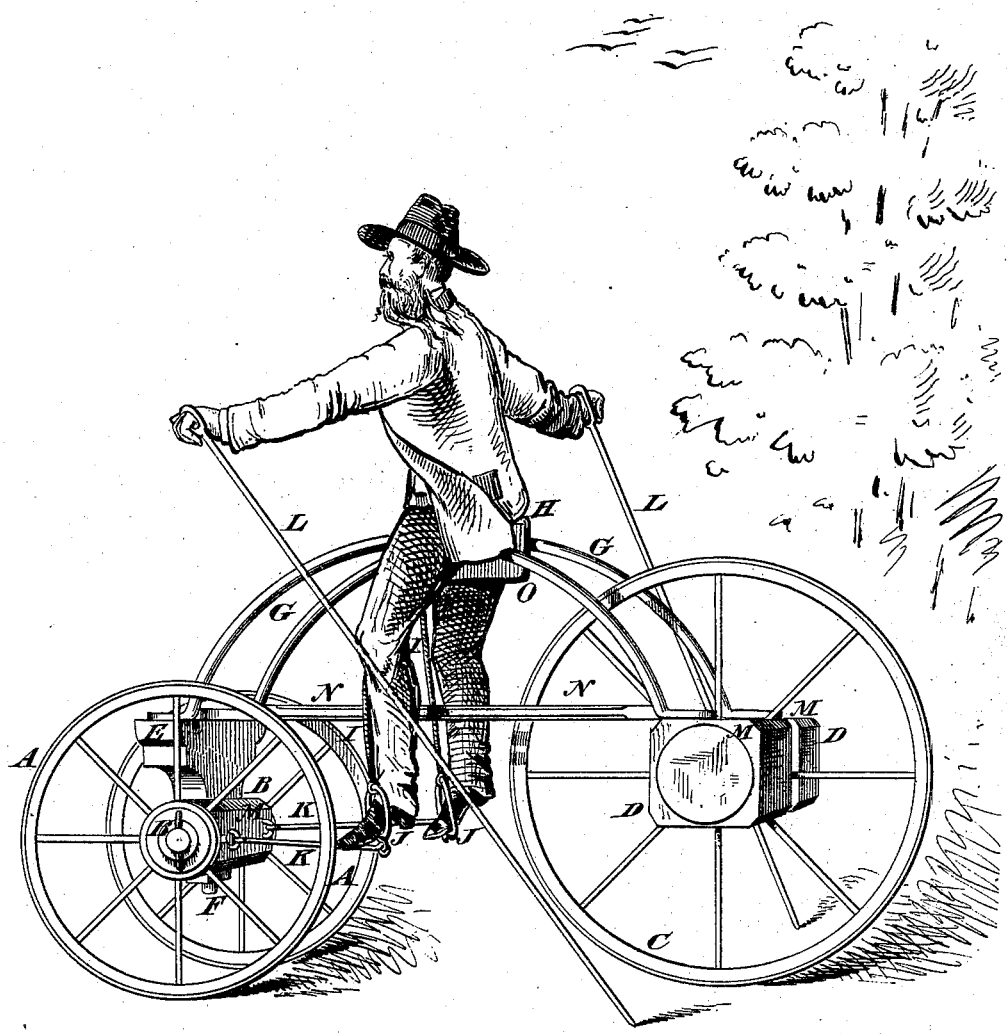
WITNESSES:
INVENTOR:
BY
ATTORNEYS.

UNITED STATES PATENT OFFICE.

MATTHEW E. CROFT, OF HORICON, WISCONSIN.

IMPROVEMENT IN TRICYCLES.

Specification forming part of Letters Patent No. 194,416, dated August 21, 1877; application filed February 17, 1877.

*To all whom it may concern:*

Be it known that I, MATTHEW EDWARD CROFT, of Horicon, in the county of Dodge and State of Wisconsin, have invented a new and useful Improvement in Tricycle, of which the following is a specification:

The figure is a perspective view of my improved tricycle, illustrating its use.

The object of this invention is to furnish an improved tricycle designed for use by mechanics and others for going to and from their places of business, by merchants and others for sending small parcels from one place to another, and by youths and others for amusement and exercise, and which shall be simple in construction and easily operated.

The invention consists in the combination of the arched bars, the block, the seat, the cord, the stirrups, the rods, and the stay-bars, with the wheels, the axles, the tubes, and the bolster.

A are the two fore wheels, which revolve upon journals at the ends of the forward axle B. C is the single rear wheel, which revolves upon a journal at the center of the rear axle D. The fore wheels A are smaller than the rear wheel C, and the forward axle B is pivoted at its center to the center of the bolster E by a king-bolt, F. G are two arched bars, the rear ends of which are bolted to the end parts of the rear axle D, and their forward ends are bolted to the end parts of the bolster E. The arched bars G incline toward each other, so that their middle parts may be near each other, and to said middle parts is secured a block, O, which gives strength and rigidity to the bars G, and to which is secured the seat or saddle H, upon which the rider sits. The middle parts of the bars G are bolted to each other and to the block O. Over the forward part of the seat H passes a cord, I, to the ends of which are attached stirrups J, to receive the rider's feet.

To the stirrups J are pivoted the rear ends of two rods, K, the forward ends of which are pivoted to the forward axle B, near its ends, so that the rider can guide and turn the machine with his feet.

The rider propels the machine by means of two rods, L, which he holds in his hands, and which he presses against the ground. In starting, the rider presses both rods L against the ground at the same time, but after he has got up enough motion to give momentum to the machine, he can use the rods L alternately.

N are stay-bars, the rear ends of which are attached to the rear axle D, and their forward ends are attached to the bolster E. The stay-bars N are designed to keep the arched bars G from springing or spreading.

The tricycle may be made of any desired size or strength, and of wood or iron, or both, according as the person or the purpose for which it is intended may require.

Upon the rear axle D, upon both sides of the wheel C, and upon the forward axle B, between the wheels A, are placed tubes M to prevent the said wheels from wabbling.

The fore wheels A are further secured against wabbling by large washers placed upon the ends of the axle B, and secured by pins passed through said axle.

Metal tubes may also be placed in the hubs of the wheels A C, to prevent friction.

If desired, a receptacle may be secured to the bolster E, to contain a lunch or other small parcels.

Having thus described my invention, I claim as new and desire to secure by Letters Patent—

The combination of the arched bars G, the block O, the seat H, the cord I, the stirrups J, the rods K, and the stay-bars N, with the wheels A A C, the axles B D, the tubes M, and the bolster E, substantially as herein shown and described.

M. E. CROFT.

Witnesses:
   A. G. WOOD,
   JOHN WOOD.